United States Patent
Labedz

(10) Patent No.: US 7,689,228 B2
(45) Date of Patent: Mar. 30, 2010

(54) METHOD AND APPARATUS FOR PROVIDING IN-BAND WIRELESS BACKHAUL

(75) Inventor: Gerald P. Labedz, Chicago, IL (US)

(73) Assignee: Motorola, Inc., Schaumburg, IL (US)

(*) Notice: Subject to any disclaimer, the term of this patent is extended or adjusted under 35 U.S.C. 154(b) by 947 days.

(21) Appl. No.: 11/434,312

(22) Filed: May 15, 2006

(65) Prior Publication Data
US 2007/0265013 A1     Nov. 15, 2007

(51) Int. Cl.
*H04Q 7/20* (2006.01)
(52) U.S. Cl. ............... 455/452.1; 455/450; 455/426.2; 455/446; 455/42; 455/426.1; 370/321; 370/328; 370/338; 370/341; 370/349; 375/220; 375/356
(58) Field of Classification Search .............. None
See application file for complete search history.

(56) References Cited

U.S. PATENT DOCUMENTS 5,506,867 A * 4/1996 Kotzin et al. ............ 375/220
6,687,503 B1 * 2/2004 Porter et al. ............ 455/452.1

OTHER PUBLICATIONS

Weiss, Martin: "Licensed Spectrum Solutions Emerge As Wireless Options, Cable Operators Can Choose From More Than Wi-Fi or WIMAX Services", Cable Digital News, Aug. 2005 pp. 1-2.

* cited by examiner

*Primary Examiner*—Charles N. Appiah
*Assistant Examiner*—Randy Peaches

(57) ABSTRACT

Various embodiments are described to address the need for providing wireless backhaul that may reduce operator startup costs while avoiding some of the drawbacks present in the prior art approaches. Generally expressed, the wireless network equipment (WNE) (121) of a collector cell provides access to a backhaul network (151) to one or more neighboring cells (122) via in-band wireless signaling. Given the frequency bands used by the collector cell WNE for communication with remote units, one portion of each band used for user traffic while another portion of each band is used for backhaul traffic. Having backhaul and user traffic share the assigned frequency bands can eliminate the need to license additional bands for wireless backhaul. Moreover, utilizing a portion of the existing, in-band orthogonal channels may be more spectrally efficient than using a separate radio in the same band.

13 Claims, 8 Drawing Sheets

METHOD AND APPARATUS FOR PROVIDING IN-BAND WIRELESS BACKHAUL

FIELD OF THE INVENTION

The present invention relates generally to wireless communications and, in particular, to providing in-band wireless backhaul for wireless communication systems.

BACKGROUND OF THE INVENTION

IEEE (Institute of Electrical and Electronics Engineers) 802.16-based systems, such as 802.16e WiMAX (Wireless Maximize) systems, have relatively small cell radii. When such systems are designed for continuous coverage, cellular-type applications, there is a need to connect a relatively large number of radio sites in each given area to the greater serving network. Connection to the greater serving network is via so-called "backhaul" connections, each of which can require substantial expense. Such "backhaul" expenses raise the startup cost that a prospective operator often must be willing to bear before building and establishing a large customer base.

To reduce startup costs associated with backhaul, the industry has turned to a couple of wireless approaches. The first approach is to multiplex the traffic from several radio sectors at a site and then use a much higher speed radio at the site to backhaul the traffic to yet another site. This typically requires additional multiplexing hardware, high bandwidth radios and a separate frequency band. A second approach under consideration is to further multiplex the traffic from several sites to one master site using a second frequency band wide enough to multiplex several sites worth of traffic. However, this type of approach is believed to require a very fast Media Access Control (MAC) protocol, which is believed to have not yet been developed.

Accordingly, it would be desirable to have a method and apparatus for providing wireless backhaul that may reduce operator startup costs while avoiding some of the drawbacks present in the prior art approaches.

Specific embodiments of the present invention are disclosed below with reference to FIGS. 1-8. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing and all such modifications to the specific embodiments described below are intended to be included within the scope of the present invention.

DETAILED DESCRIPTION OF EMBODIMENTS

Various embodiments are described to address the need for providing wireless backhaul that may reduce operator startup costs while avoiding some of the drawbacks present in the prior art approaches. Generally expressed, the wireless network equipment (WNE) of a collector cell provides access to a backhaul network to one or more neighboring cells via in-band wireless signaling. Given the frequency bands used by the collector cell WNE for communication with remote units, one portion of each band used for user traffic while another portion of each band is used for backhaul traffic. Having backhaul and user traffic share the assigned frequency bands can eliminate the need to license additional bands for wireless backhaul. Moreover, utilizing a portion of the existing, in-band orthogonal channels may be more spectrally efficient than using a separate radio in the same band.

Figure 1:
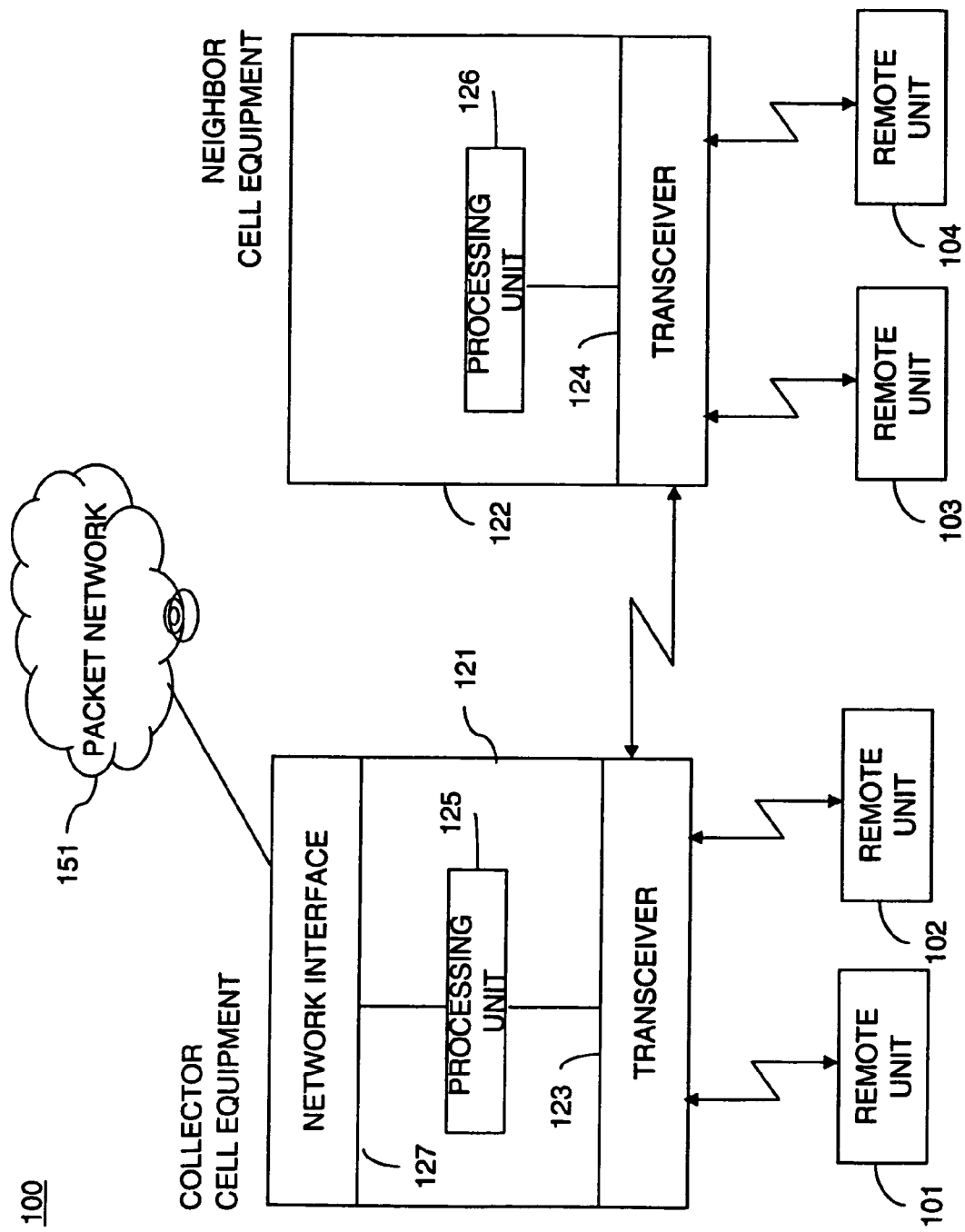
FIG. 1 is a block diagram depiction of a wireless communication system in accordance with multiple embodiments of the present invention.

The present invention can be more fully understood with reference to FIGS. 1-8. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE 802 are developing standards specifications for wireless telecommunications systems. (These groups may be contacted via http://www.openmobilealliance.com, http://www.3gpp.org/, http://www.3gpp2.com/and http://www.ieee802.org/, respectively.) Communication system 100 represents a system having an architecture in accordance with IEEE 802.16 technologies, suitably modified to implement the present invention. Alternative embodiments of the present invention may be implemented in communication systems that employ other or additional technologies such as, but not limited to, those described in the other IEEE 802 specifications, the 3GPP specifications and/or those described in the 3GPP2 specifications.

Communication system 100 is depicted in a very generalized manner, shown to comprise packet network 151, wireless network equipment (WNE) 121 and 122, and remote units 101-104. Those skilled in the art will recognize that FIG. 1 does not depict all of the network equipment necessary for system 100 to operate commercially but only those system components and logical entities particularly relevant to the description of embodiments herein. For example, depending on the embodiment, WNE 121 and 122 may each represent a base transceiver station (BTS), an access point (AP), and/or a higher order device such as a wideband base station (WBS) or WLAN (wireless local area network) station or even a radio access network (RAN) or access network (AN); however, none of these devices are specifically shown in FIG. 1.

Remote units 101-104 and WNE 121 and 122 are shown communicating via technology-dependent, wireless interfaces such as the 802.16e air interface. Remote units, subscriber stations (SSs) or user equipment (UEs), may be thought of as mobile stations (MSs); however, remote units are not necessarily mobile nor able to move. In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). In particular, remote units 101-104 comprise a processing unit (not shown) and transceiver (not shown). Depending on the embodiment, remote units 101-104 may additionally comprise a keypad (not shown), a speaker (not shown), a microphone (not shown), and a display (not shown). Processing units, transceivers, keypads, speakers, microphones, and displays as used in remote units are all well-known in the art.

In general, components such as processing units and transceivers are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, WNE 121 and 122 represent known devices that have been adapted, in accordance with the description herein, to implement multiple embodiments of the present invention.

Furthermore, those skilled in the art will recognize that aspects of the present invention may be implemented in and/or across various physical components and none are necessarily limited to single platform implementations. For example, the WNE may be implemented in or across one or more networked or otherwise communicatively coupled devices, such as communication infrastructure devices and/or wireless devices. Also, WNE and remote unit transceivers are referred to throughout the present application as "transceiver"; however, "transceiver," as used herein, should more generally be understood to refer to transceiver equipment which may be embodied to include more than one physical transceiver device.

Figure 2:
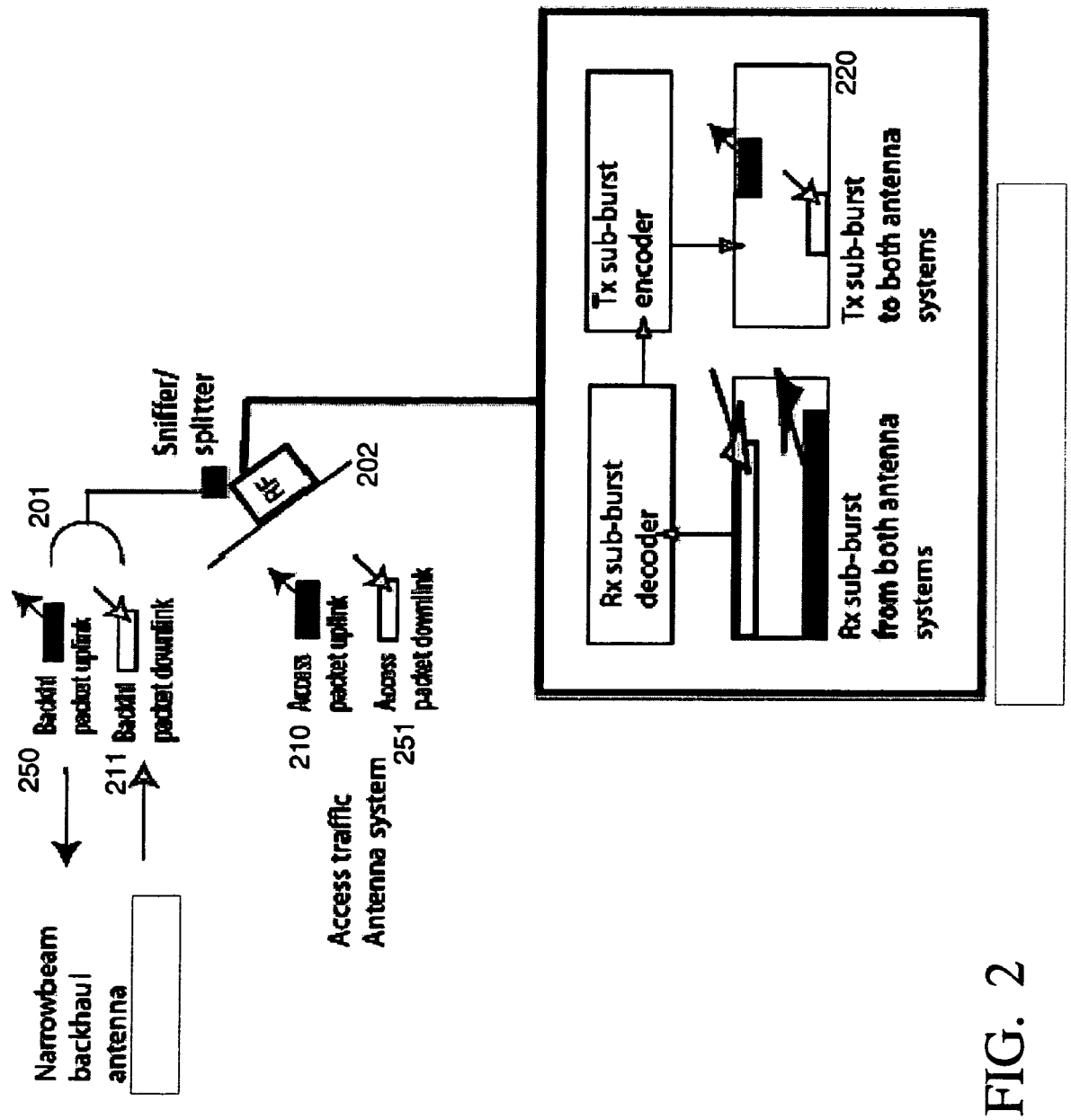
FIG. 2 is a block diagram depiction of a dual-antenna system in accordance with multiple embodiments of the present invention.
Figure 3:
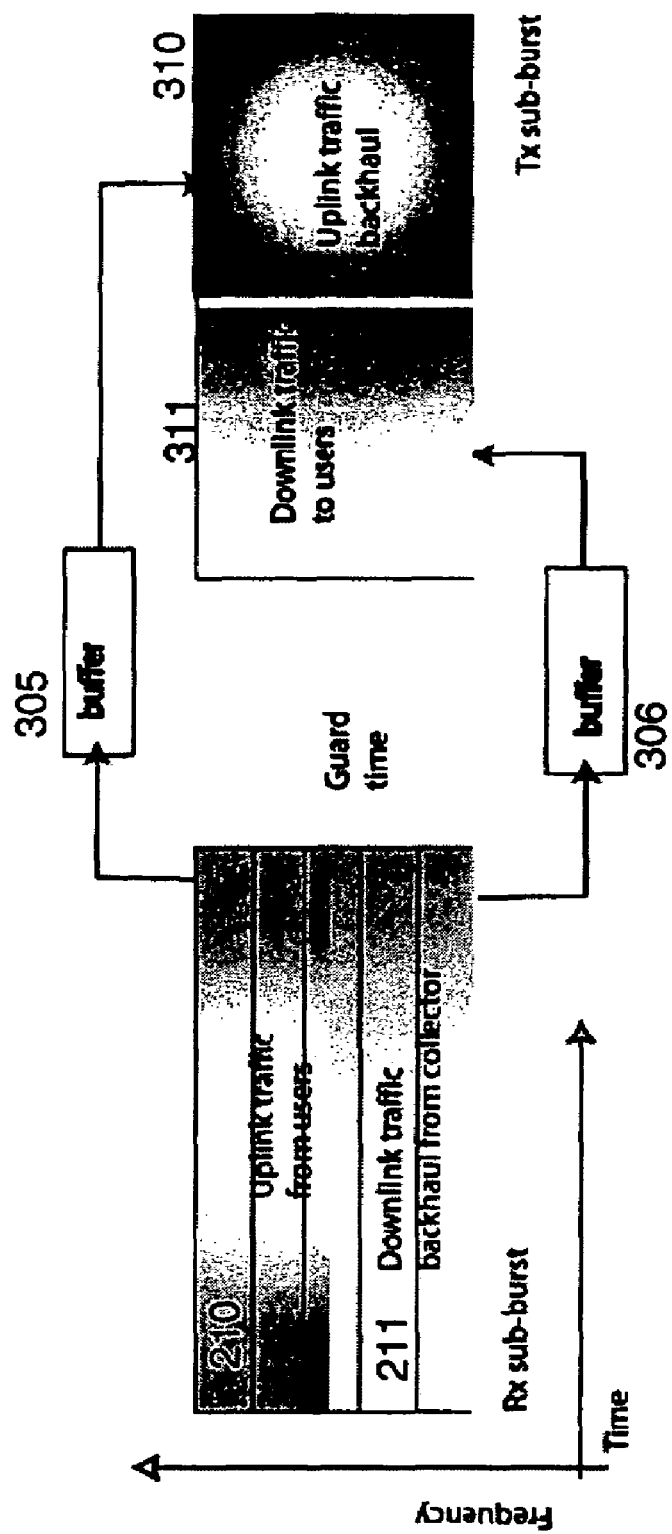
FIG. 3 is a block diagram depiction of frame processing in accordance with multiple embodiments of the present invention.
Figure 4:
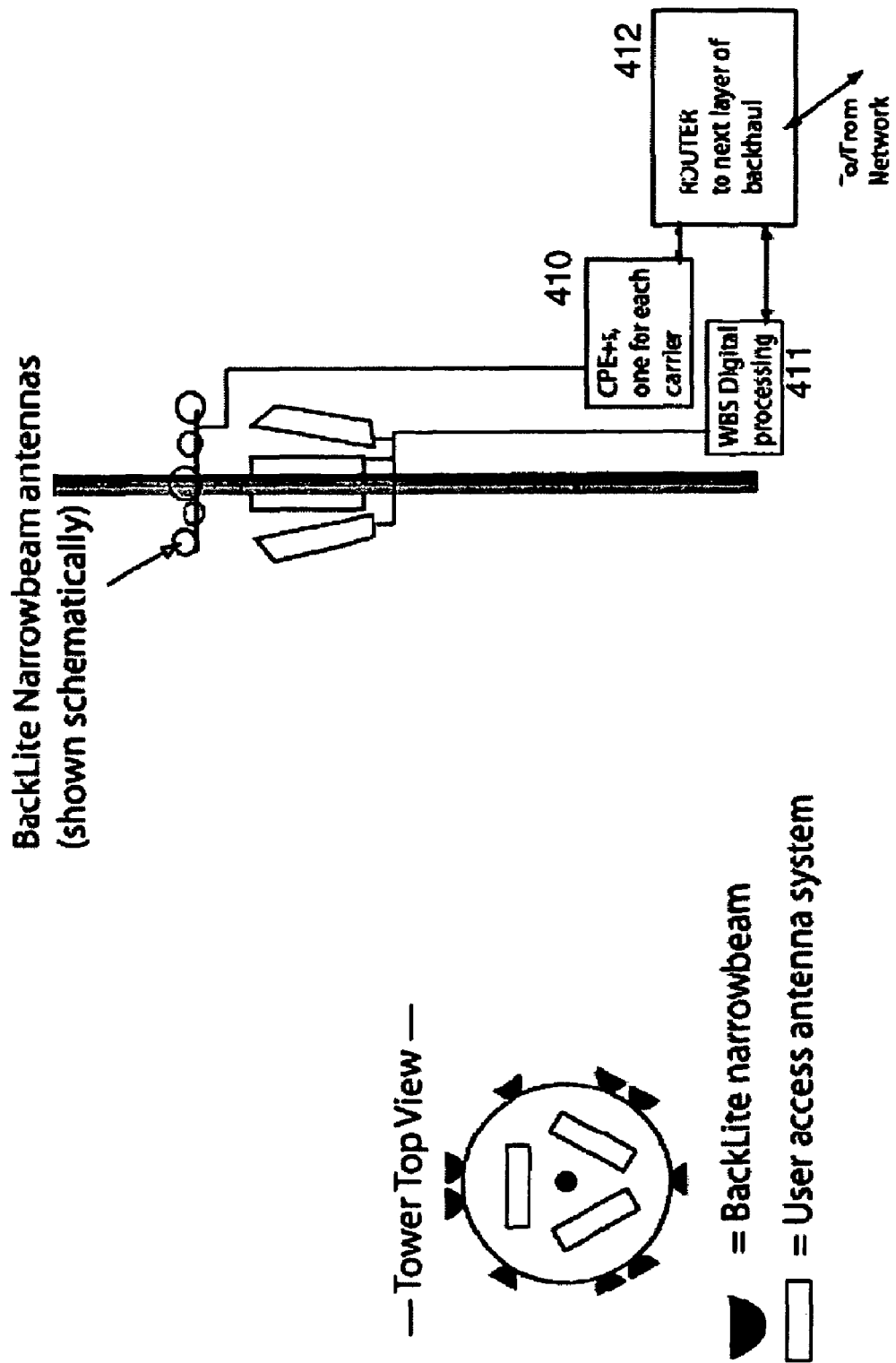
FIG. 4 is another depiction of a dual-antenna system in accordance with multiple embodiments of the present invention.

First, to provide specific examples of some of the different aspects of particular embodiments of the present invention, one implementation (referred to as "BackLite") will be described in detail below with reference to FIGS. 2-8. FIGS. 2 and 4 depict a dual-antenna system and FIG. 3 depicts frame processing, all in accordance with the BackLite implementation and multiple embodiments of the present invention. With BackLite, as with various other embodiments of the present invention, the startup costs associated with installing an 802.16e system can be reduced. Also, having backhaul and user traffic share the assigned frequency band can eliminate the need to license another band for wireless backhaul.

In this approach, some of the orthogonal channels, which are not needed for the initial system deployment, are used for backhaul traffic. Utilizing some of the existing orthogonal channels is much more spectrally efficient than placing a separate radio in the same band. Thus, in BackLite, some of the receive channels pick up regular traffic from users and utilize predefined transmit channels to relay the information to a "collection site" using the same base equipment. In a similar manner, some predefined receive channels catch traffic from the collection site meant for users and transmit it on normal traffic channels down to the users, again using the same base equipment. The collection site uses slightly modified Customer Premises Equipment (CPE) 410, referred to as "CPE+", to move the backhaul traffic in an out of the larger communications network.

In general, a transmitter and a receiver at a BackLite base station (a.k.a., wideband base station or cellular access point) are used simultaneously for subscriber traffic and wireless backhaul. In each TDD (time division duplex) burst, part of the uplink and downlink sub-bursts is reserved for backhaul traffic. For backhauling uplink traffic, the uplink traffic 210 (see FIGS. 2 and 3) from the subscriber units is captured and decoded by the receiver, stored in a buffer 305, then packed into part 310 of the downlink burst. When the downlink burst is sent, it goes out both antenna systems simultaneously, one (access antenna system 202) pointed at the traffic coverage area and one (narrowbeam antenna system 201) along a path to a backhaul collection point (which is co-located with another base station). A receiver at the collection site, built like a Customer Premises Equipment (CPE), knows that part of the sub-burst dedicated to backhaul traffic and decodes it, and then sends it along another higher rate backhaul system to the larger network. In similar manner, downlink traffic 211 is transmitted back along this same path by the modified CPE, where the base station receiver, which has some of its capacity allocated to backhaul, captures it and, through a buffer 306, packs the information into the part 311 of the downlink sub-burst dedicated to subscriber traffic.

Stated differently, the essence of what happens is that the base receiver collects information from both the user uplink traffic 210 and information from the backhaul collection point which contains the user downlink traffic 211. Information collected from user traffic needs to move to a backhaul collecting point (backhaul uplink traffic 250) and is thus inserted in the transmit burst part 220 of the timeslot, using the "channels" reserved for backhaul traffic. Subscribers are not assigned these channels. Information for users that needs to be sent on the downlink will come from the CPE+ (backhaul downlink traffic 211), again received by the base receiver, and inserted into downlink channels reserved for user traffic 251. This to/from arrangement is the backhaul. When the transmit part of the timeslot is sent, it is listened to by both the subscribers and the CPE+. Their transmissions will come from different antenna systems, a directional one for backhaul, and the typical access antenna system for subscriber coverage. The subscribers will find and decode their traffic channels, and the CPE+ will find and decode its backhaul channels.

Backhaul via BackLite is accomplished by utilizing part of the transmit and receive TDD half-frames for traffic moving to and away from each base site, and therefore all access traffic and backhaul traffic are in the same frequency band. Traffic intended for subscriber devices within the range of the WBS co-located with the collection point is sent from the network directly to the unmodified WBS 411 where it is inserted in the downlink channel to the subscriber units. Information targeted for subscriber units located in the remote sites whose backhaul is served by the collection point is routed from the network to the CPE+ 410 where it is transmitted in the uplink channel to the modified WBS at the remote site. From there, the data are routed internally from the receive part of the burst in the modified WBS and inserted in the downlink channel to the target subscriber devices in channels dedicated to access.

In the reverse direction, subscriber data intended to be sent into the network is sent in the uplink channel from the subscriber to the modified WBS where it is captured in the receive part of the burst and inserted into the downlink channel toward the CPE+ 410 at the collection point, then delivered to the router 412 that sends the information to the "system backhaul." Access data from subscriber devices served by the unmodified WBS 411 that is co-located with the collection point CPE+ devices 410 is sent on an access channel uplink to the WBS and delivered to the router 412 into the "system backhaul" network.

Note that at the modified WBSs, the access and backhaul traffic are both received on the receive half of the TDD burst, while the access and backhaul traffic are both transmitted on the Tx part of the burst. Physically, both access and backhaul traffic go in and out simultaneously on both the access and narrowbeam (high gain) backhaul antenna systems. But because subscribers do not look for the backhaul channels and the CPE+ does not look for the access channels, and because the antenna systems are effectively isolated from each other, access traffic and backhaul can share the same carrier.

Note also that the collection points are made up entirely of CPE+s that exclusively carry backhaul traffic. At the collection point locations, the unmodified WBSs handle the local traffic. Also, other than combining different traffic and backhaul channels together in the TDD burst, which should not require any special processing of the channels, access and backhaul traffic need not be combined elsewhere in the system.

A CPE+ has the same Tx and Rx characteristics as a typical CPE, except that a CPE+ is capable of extracting several channels, not just one. This is because it is transmitting and receiving the entire backhaul traffic for a sector at the collection point. Collection points are co-located with some of the WBSs. In a 1:3:3 plan, for example, one in four WBSs has a collection point associated with it. Each collection point, in a 1:3:3 plan, consists of 9 CPE+s and lines connecting them to some router to the next level of backhaul (e.g., T1, OC-3, another wireless backhaul, etc.) The CPE+s use high gain, narrowbeam antennas and do not need to share the WBS antenna systems. Physically the collection points could be anywhere, but for convenience (and due to the frequency reuse plan) they are co-located with a WBS. Only on non-collection point WBSs are a narrowbeam and access antenna system connected together for use by the WBS transceiver. At the collection points, the backhaul part of the system, embodied by the CPE+s, and the WBS need not be connected at all.

Changes to a WBS recommended to implement a BackLite system include the following. A buffering mechanism should be attached on a data bus from the uplink channel decoder to capture all up link access traffic coming from system subscribers. All of this traffic will be backhauled via the downlink part of the TDD burst. This downlink is simultaneously going physically "down" and "across" to the collection point. Since the backhaul "downlink" channels are not assigned to users, they are invisible to users, even though they are emitted from the access antenna system. Since this backhaul traffic probably cannot be transmitted immediately due to hardware and software constraints, it must be held and placed in the channels assigned to backhaul on the downlink TDD half burst at the first available downlink TDD burst.

Similarly, a buffering mechanism should be attached on a data bus from the uplink channel decoder, to capture all backhaul data traffic from the CPE+ coming from the collection point on the narrowbeam antenna. These two buffer mechanisms should know how channels are allocated between access and backhaul.

The Tx/Rx antenna system needs to have added to it a narrowbeam, high gain antenna system for backhaul. The transceiver is attached to both the access antenna system and the narrowbeam antenna system. It is preferred that most of the power go to/from the access antenna system by using a connector and a tap for the backhaul narrowbeam antenna. It should be determined how low the power to the backhaul antenna can be by using a combination of antenna gain, point-to-point propagation and low-order modulation. Two sectors may possibly be combined onto one narrowbeam antenna in some implementations.

Changes to a CPE recommended to implement a BackLite CPE+ include the following. It is the CPE+ that is connected to the ingress/egress for the system. The collection point is independent of the co-located WBS as far as radio processing is concerned. However, they may of course share electrical, tower and the like. Each CPE+ needs to have processing power enough to move the traffic for its sector in and out after FFT (Fast Fourier transform) and other processing, whereas a CPE is currently designed to handle the traffic of a single user.

The CPE+'s narrowbeam antenna will sometimes be faced in the same direction as the adjacent channel, and therefore some isolation may be required at the collection point for these two antennas. Also, CPE+s may share a narrowbeam antenna. Either way, more stringent filtering than that for a consumer CPE may be required. Additionally, the signals from the CPE+s to the WBS receivers need to be time aligned with the received access signals.

IEEE 802.16e allows considerable flexibility in the setting of operating parameters. The BackLite implementation can take advantage of some of this flexibility. Depending upon the exact TDD burst time settings, and the cell sizes used in a particular system design, a number of parameters can be advantageously manipulated. As has been mentioned, backhaul is done to and from a collection point co-located with a base station. Propagation to and from that collection point will, by design, be further than a cell radius, and hence will experience delay and attenuation different than that in the user coverage area.

It is expected that the backhaul antenna system will be mounted higher than the coverage area antennas or at least aimed horizontally toward the collection point. The propagation time will be longer (at least twice as long), but the attenuation constant will be lower. It is likely that the popular 70% downlink 30% uplink split of the TDD frame will need to be closer to 50-50%. It could be that higher order modulation will be used in the backhaul channels to take up less time in each sub-burst. There will be a power loss at any splitter used to connect the two antenna systems to the transceiver. However, the much lower propagation constant, and the directional gain of the backhaul antenna system can make up for the losses. If the extra propagation time from the backhaul collection point interferes with the burst length/guard time of the individual cells, the backhaul transmit burst may have to be shortened.

Figure 5:
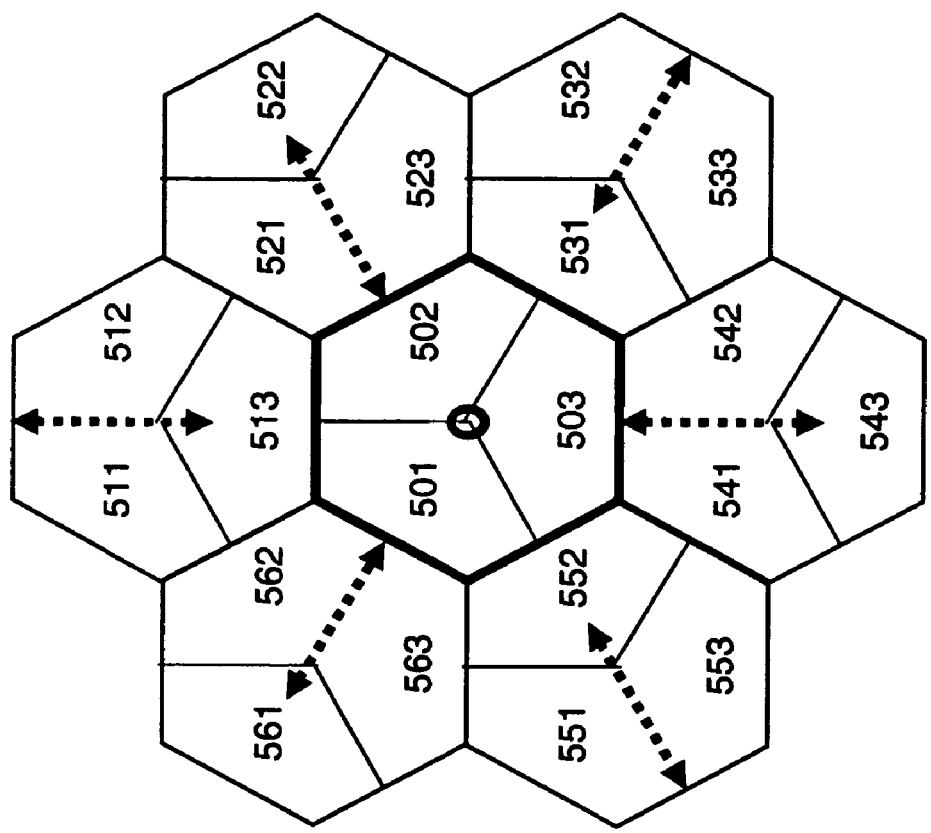
FIG. 5 is a block diagram depiction of an idealized 1:3:3 frequency plan in accordance with multiple embodiments of the present invention.

Although the same frequency bands are used for both access and backhaul traffic, the transmit and receive paths for backhaul use physically separate narrow beam antennas pointed to create a different frequency reuse pattern than the traffic frequency reuse pattern. FIGS. 5-8 provide some, but not all examples, of the possible frequency plans that may be used. FIG. 5 is a block diagram depiction of an idealized 1:3:3 frequency plan (each cell having 3 sectors and using 3 unique frequency bands) in accordance with multiple embodiments of the present invention. Frequency plan 500 represents a basic 802.16e frequency plan (although it is not limited to 802.16e by any means) with the addition of a backhaul collector cell (shown by the small circle at the cell center). The collector cell includes wireless coverage areas 501-503, which correspond to a first, a second and a third sector of the collector cell, respectively.

Since frequency plan 500 is a 1:3:3 frequency plan, each cell uses three unique frequency bands, a first, a second and a third frequency band. Sectors of each cell that are labeled with a reference number ending in a "1" use the first frequency band, sectors labeled with a reference number ending in a "2" use the second frequency band, and sectors labeled with a reference number ending in a "3" use the third frequency band. The dashed-line arrows depict the direction of the narrowbeam antennas used for transmitting backhaul traffic from each neighbor cell to the collector cell (and to other collector cells not shown). In frequency plan 500, all of the neighbor cells transmitting backhaul traffic to the collector cell are also adjacent to the collector cell, but this need not necessarily be the case with other frequency plans.

As depicted in FIG. 5, the six neighbor cells each transmit and receive backhaul traffic for one or two of their respective sectors to and from the collector cell. Furthermore, the backhaul traffic from each sector is transmitted and received using the frequency band (more specifically, the backhaul portion of the frequency band) associated with that individual sector. For example, backhaul traffic for sector 513 is transmitted and received, to and from the collector cell using the third frequency band. Thus, as depicted in FIG. 5, backhaul traffic for sectors 513, 521, 523, 531, 541, 542, 552, 562 and 563 is transmitted and received, to and from the collector cell using a backhaul portion of the frequency band indicated by the sector's ending reference number digit.

It can be seen from FIG. 5 that the backhaul distance in each case is 2r and the interference distance is therefore 6r, where r is the nominal cell radius. The collector cell handles traffic from 12 sectors, its own three and nine others. While this traffic may come from seven physical base stations (depending on the embodiment), it represents the traffic of four cells. Also, while there are nine carriers impinging on a single collection point, the nine may be isolated from each other by the directionality of the narrowbeam antennas used. In frequency plan 500, the angular separation between them is 60 degrees, which is wider than required. However, in some cases, for geographical or propagation reasons, it may be necessary to change the polarization of some of the narrowbeam antennas to increase the isolation between paths on the same frequency, for example among 542, 552 and 562.

Figure 6:
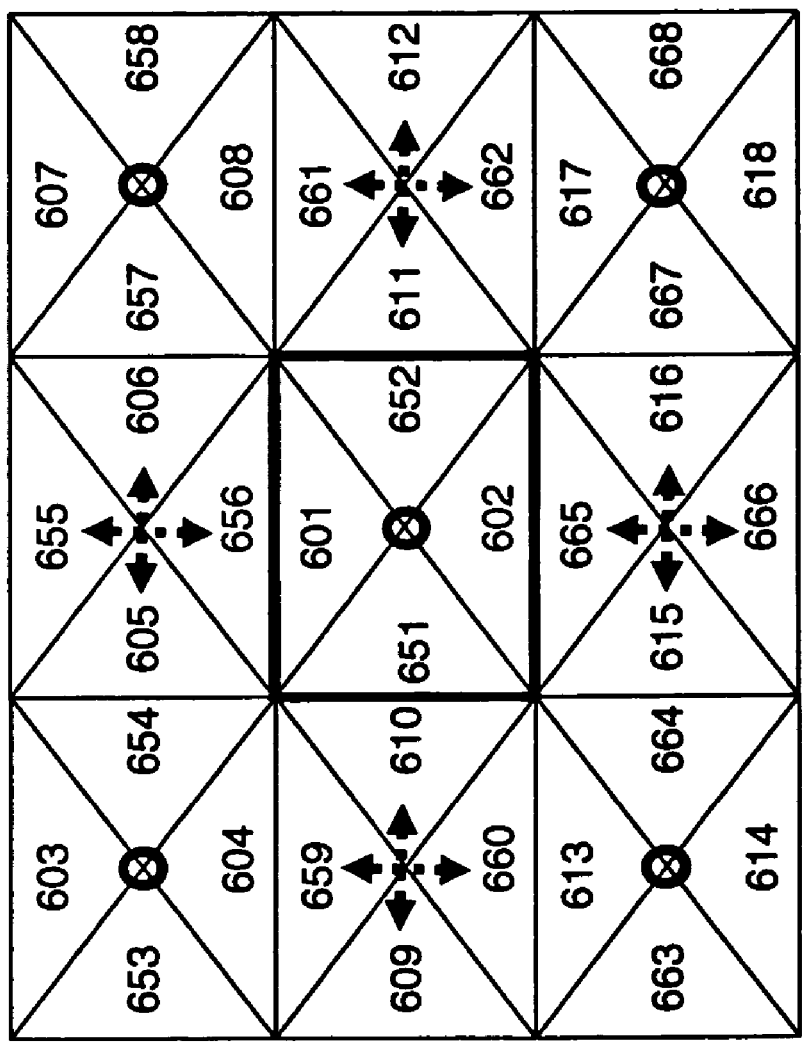
FIG. 6 is a block diagram depiction of an idealized 1:4:2 frequency plan in accordance with multiple embodiments of the present invention.

FIG. 6 is a block diagram depiction of an idealized 1:4:2 frequency plan in accordance with multiple embodiments of the present invention. Frequency plan 600 represents an alternative frequency plan with the addition of backhaul collector cells (shown by the small circles at various cell centers). The collector cell in the center includes wireless coverage areas 601, 651, 602 and 652, which correspond to a first, a second, a third and a fourth sector of the collector cell, respectively.

Since frequency plan 600 is a 1:4:2 frequency plan, each cell has four sectors but uses two unique frequency bands, a first and a second frequency band. Sectors of each cell that are labeled with a reference number below 650 use the first frequency band, while sectors labeled with a reference number greater than 650 use the second frequency band. The dashed-line arrows depict the direction of the narrowbeam antennas used for transmitting backhaul traffic from each neighbor cell to the collector cells (and to other collector cells not shown). In frequency plan 600, all of the neighbor cells transmitting backhaul traffic to the collector cells are also adjacent to the target collector cells, but this need not necessarily be the case with other frequency plans.

As depicted in FIG. 6, the four neighbor cells (left, right, top and bottom) of the central collector cell each transmit and receive backhaul traffic for one of their respective sectors to and from the collector cell. Furthermore, the backhaul traffic from each sector is transmitted and received using the frequency band (more specifically, the backhaul portion of the frequency band) associated with that individual sector. For example, backhaul traffic for sector 656 is transmitted and received, to and from the collector cell using the second frequency band. Thus, as depicted in FIG. 6, backhaul traffic for sectors 656, 610, 665 and 611 is transmitted and received, to and from the collector cell using a backhaul portion of the frequency band indicated by the sector's reference number.

Figure 7:
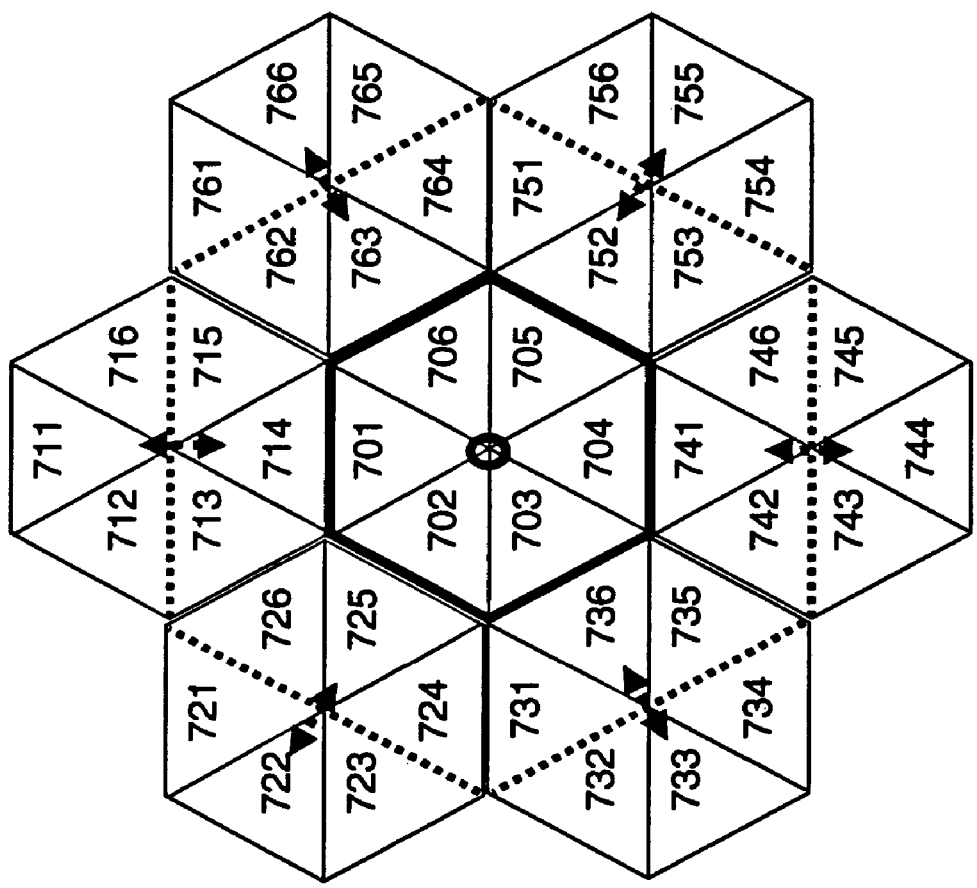
FIG. 7 is a block diagram depiction of an idealized 1:6:6 frequency plan with collector cells aligned across the centers of sectors in accordance with multiple embodiments of the present invention.

FIG. 7 is a block diagram depiction of an idealized 1:6:6 frequency plan with collector cells aligned across the centers of sectors in accordance with multiple embodiments of the present invention. Frequency plan 700 represents another alternative frequency plan with the addition of a backhaul collector cell (shown by the small circle at the cell center). The collector cell includes wireless coverage areas 701-706, which correspond to a first, a second, a third, a fourth, a fifth and a sixth sector of the collector cell, respectively.

Since frequency plan 700 is a 1:6:6 frequency plan, each cell has six sectors and uses six unique frequency bands, a first, a second, a third, a fourth, a fifth and a sixth frequency band. Sectors of each cell that are labeled with a reference number ending in a "1" use the first frequency band, sectors labeled with a reference number ending in a "2" use the second frequency band, sectors labeled with a reference number ending in a "3" use the third frequency band, sectors labeled with a reference number ending in a "4" use the fourth frequency band, sectors labeled with a reference number ending in a "5" use the fifth frequency band, and sectors labeled with a reference number ending in a "6" use the sixth frequency band. The dashed-line arrows depict the direction of the narrowbeam antennas used for transmitting backhaul traffic from each neighbor cell to the collector cell (and to other collector cells not shown). In frequency plan 700, all of the neighbor cells transmitting backhaul traffic to the collector cell are also adjacent to the collector cell, but this need not necessarily be the case with other frequency plans.

As depicted in FIG. 7, the six neighbor cells each transmit and receive backhaul traffic for three of their respective sectors to and from the collector cell. Furthermore, the backhaul traffic from each sector is transmitted and received using the frequency band (more specifically, the backhaul portion of the frequency band) associated with that individual sector. For example, backhaul traffic for sector 714 is transmitted and received, to and from the collector cell using the fourth frequency band. Thus, as depicted in FIG. 7, backhaul traffic for sectors 713-715, 724-726, 731, 735, 736, 741, 742, 746, 751-753 and 762-764 is transmitted and received, to and from the collector cell using a backhaul portion of the frequency band indicated by the sector's ending reference number digit.

Figure 8:
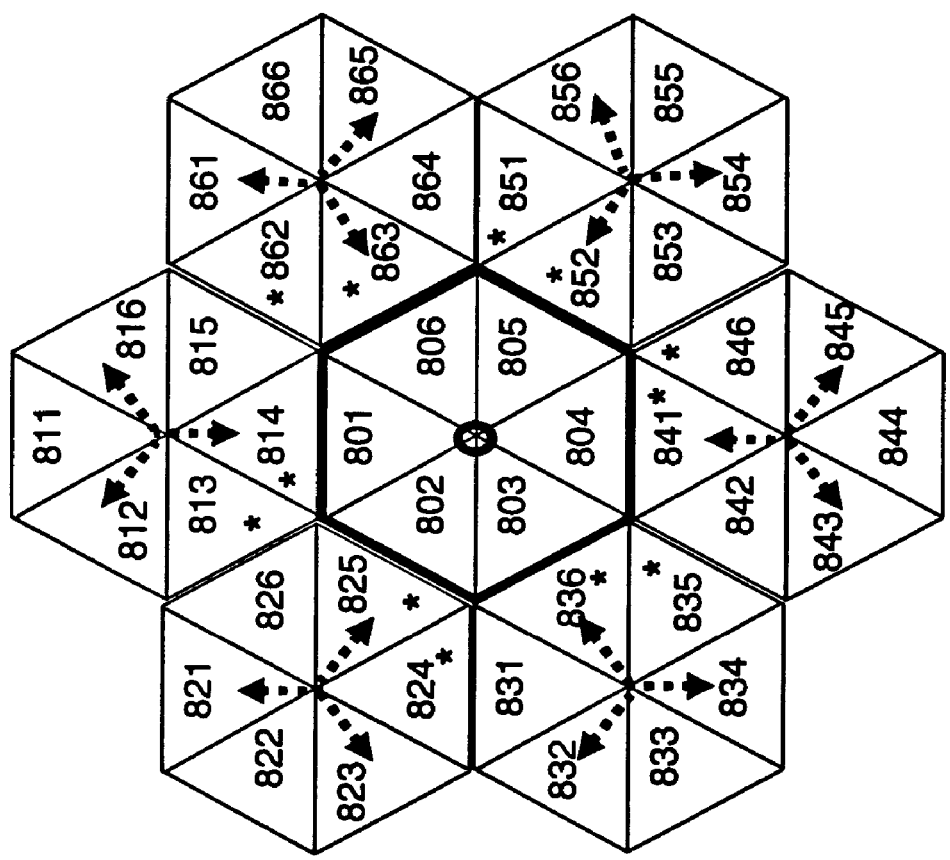
FIG. 8 is a block diagram depiction of an idealized 1:6:6 frequency plan with collector cells aligned along the edges of sectors in accordance with multiple embodiments of the present invention.

FIG. 8 is a block diagram depiction of an idealized 1:6:6 frequency plan with collector cells aligned along the edges of sectors in accordance with multiple embodiments of the present invention. Frequency plan 800 represents another alternative frequency plan with the addition of a backhaul collector cell (shown by the small circle at the cell center).

The collector cell includes wireless coverage areas 801-806, which correspond to a first, a second, a third, a fourth, a fifth and a sixth sector of the collector cell, respectively.

Since frequency plan 800 is a 1:6:6 frequency plan, each cell has six sectors and uses six unique frequency bands, a first, a second, a third, a fourth, a fifth and a sixth frequency band. Sectors of each cell that are labeled with a reference number ending in a "1" use the first frequency band, sectors labeled with a reference number ending in a "2" use the second frequency band, sectors labeled with a reference number ending in a "3" use the third frequency band, sectors labeled with a reference number ending in a "4" use the fourth frequency band, sectors labeled with a reference number ending in a "5" use the fifth frequency band, and sectors labeled with a reference number ending in a "6" use the sixth frequency band. The dashed-line arrows depict the direction of the narrowbeam antennas used for transmitting backhaul traffic from each neighbor cell to the collector cell (and to other collector cells not shown). In frequency plan 800, all of the neighbor cells transmitting backhaul traffic to the collector cell are also adjacent to the collector cell, but this need not necessarily be the case with other frequency plans.

As depicted in FIG. 8, the six neighbor cells each transmit and receive backhaul traffic for two of their respective sectors (the sectors with asterisks, e.g.) to and from the collector cell. Furthermore, the backhaul traffic from each sector is transmitted and received using the frequency band (more specifically, the backhaul portion of the frequency band) associated with that individual sector. For example, backhaul traffic for sector 814 is transmitted and received, to and from the collector cell using the fourth frequency band. Thus, as depicted in FIG. 8, backhaul traffic for sectors 813, 814, 825, 826, 835, 836, 841, 846, 851, 852, 862 and 863 is transmitted and received, to and from the collector cell using a backhaul portion of the frequency band indicated by the sector's ending reference number digit.

A detailed description of the BackLite implementation and some potential frequency plans has been provided above. Operation of some more generalized embodiments of the present invention occurs substantially as follows, with reference to FIG. 1. Wireless network equipment (WNE) 121 and 122 respectively represent collector cell equipment and neighbor cell equipment. As collector cell equipment, WNE 121 includes network interface 127 which provides connectivity to a backhaul network such as packet network 151. As neighbor cell equipment, WNE 122 utilizes wireless backhaul signaling with WNE 121 to obtain connectivity to the backhaul network.

Processing unit 126 of WNE 122 receives uplink traffic from remote units 103 and/or 104 within the wireless coverage area of WNE 122 using transceiver 124 and a user portion of at least one frequency band. Remote units 103 and 104 may be in the same coverage area or sector of WNE 122 or in different coverage areas of WNE 122, and depending on the frequency plan being used, they may in either case be using the same or different frequency bands for communication with WNE 122.

Also, depending on the particular embodiment, the uplink traffic may be transmitted in uplink frames, perhaps OFDM (orthogonal frequency division multiplexing) uplink frames. In the case in which OFDM signaling is used, the frequency bands include OFDM subchannels (i.e., frequency subchannels). Thus, the user portion of a frequency band may comprise a set of the OFDM subchannels. For a receive frame, then, the user portion would be the user subchannels of the receive frame.

Processing unit 126 of WNE 122 then transmits the uplink traffic from the remote units to WNE 121 using transceiver 124 and a backhaul portion of the one or more frequency bands used to receive the uplink traffic from the remote units.

In the OFDM embodiments, the backhaul portion of the one or more frequency bands may also comprise a set of the OFDM subchannels in these frequency bands. For a transmit frame, then, the backhaul portion would be the backhaul subchannels of the transmit frame.

Processing unit 126 of WNE 122 also receives downlink traffic from WNE 121 using transceiver 124 and a backhaul portion of the one or more frequency bands used for the targeted remote units. In the OFDM embodiments, the backhaul portion of the one or more frequency bands may also comprise a set of the OFDM subchannels in these frequency bands. Also, for a given receive frame, the user set of subchannels and the backhaul set of subchannels would be non-overlapping.

Processing unit 126 of WNE 122 then transmits the downlink traffic from WNE 121 to the targeted remote units using transceiver 124 and a user portion of the one or more frequency bands used for the targeted remote units. Again, in the OFDM embodiments and for a given transmit frame the user set of subchannels (the user portion of a frequency band) and the backhaul set of subchannels would be non-overlapping.

Thus, processing unit 125 of WNE 121 transmits and receives traffic to and from WNE 122 using transceiver 123 and a backhaul portion of one or more frequency bands. The received backhaul traffic destined for the backhaul network is then forwarded by processing unit 125 on to network 151 via network interface 127. Processing unit 125 of WNE 121 also, of course, transmits and receives traffic to and from remote units 101 and 102, e.g., within the wireless coverage area of WNE 121 using transceiver 123 and a user portion of one or more frequency bands.

As described above with respect to embodiments such as the BackLite embodiments, transceivers 123 and 124 may comprise both access antenna systems and narrowbeam antenna systems. In these embodiments, communication between transceivers 123 and 124 and their respective remote units would utilize the access antenna systems, while communication between transceivers 123 and 124 (i.e., between collector and neighbor cell equipment) would utilize the narrowbeam antenna systems.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for providing in-band wireless backhaul connectivity, the method comprising the steps of:
   transmitting and receiving traffic, by wireless network equipment (WNE) of a collector cell, to and from remote units within a wireless coverage area of the collector cell using a user portion of at least one frequency band;
   wherein the wireless coverage area of the collector cell comprises a first, a second and a third sector of the collector cell,
   wherein traffic is transmitted and received to and from remote units within the first sector of the collector cell using a user portion of a first frequency band of the at least one frequency band,
   wherein traffic is transmitted and received to and from remote units within the second sector of the collector cell using a user portion of a second frequency band of the at least one frequency band, and
   wherein traffic is transmitted and received to and from remote units within the third sector of the collector cell using a user portion of a third frequency band of the at least one frequency band; and
   transmitting and receiving traffic, by the WNE of the collector cell, to and from WNE of a neighbor cell using a backhaul portion of the at least one frequency band.

2. The method of claim 1,
   wherein transmitting and receiving traffic to and from the remote units and to and from the WNE of the neighbor cell comprises transmitting and receiving traffic using uplink and downlink frames and
   wherein each uplink frame and each downlink frame utilizes a frequency band of the at least one frequency band and wherein the frequency band utilized by each uplink frame and each downlink frame comprises a user portion and a backhaul portion.

3. The method of claim 2,
   wherein the uplink and downlink frames comprise OFDM (orthogonal frequency division multiplexing) uplink and downlink frames,
   wherein the frequency band of the at least one frequency band comprises OFDM subchannels,
   wherein the user portion of each uplink frame comprises a first set of OFDM subchannels and the backhaul portion of each uplink frame comprises a second set of OFDM subchannels, and
   wherein the user portion of each downlink frame comprises a third set of OFDM subchannels and the backhaul portion of each downlink frame comprises a fourth set of OFDM subchannels.

4. The method of claim 1,
   wherein a wireless coverage area of the neighbor cell comprises a first sector of the neighbor cell,
   wherein the first sector of the neighbor cell is adjacent to both the first sector and the second sector of the collector cell, and
   wherein transmitting and receiving the traffic to and from the WNE of the neighbor cell comprises transmitting and receiving traffic for the first sector of the neighbor cell using a backhaul portion of the third frequency band of the at least one frequency band.

5. The method of claim 1,
   wherein a wireless coverage area of the neighbor cell comprises a first sector and a second sector of the neighbor cell,
   wherein the first sector of the neighbor cell is adjacent to the first sector of the collector cell but is not adjacent to the second sector of the collector cell nor the third sector of the collector cell,
   wherein the second sector of the neighbor cell is adjacent to the first sector of the collector cell but is not adjacent to the second sector of the collector cell nor the third sector of the collector cell,
   wherein transmitting and receiving the traffic to and from the WNE of the neighbor cell comprises transmitting and receiving traffic for the first sector of the neighbor cell using a backhaul portion of the second frequency band of the at least one frequency band, and
   wherein transmitting and receiving the traffic to and from the WNE of the neighbor cell comprises transmitting and receiving traffic for the second sector of the neighbor cell using a backhaul portion of the third frequency band of the at least one frequency band.

6. The method of claim 1,
   wherein the wireless coverage area of the collector cell comprises a first, a second, a third, and a fourth sector of the collector cell,
   wherein traffic is transmitted and received to and from remote units within the first sector of the collector cell and within the third sector of the collector cell using a user portion of a first frequency band of the at least one frequency band, and
   wherein traffic is transmitted and received to and from remote units within the second sector of the collector cell and within the fourth sector of the collector cell using a user portion of a second frequency band of the at least one frequency band.

7. The method of claim 6,
   wherein a wireless coverage area of the neighbor cell comprises a first sector of the neighbor cell,
   wherein the first sector of the neighbor cell is adjacent to the first sector of the collector cell, is not adjacent to the third sector of the collector cell, and is not substantially adjacent to either the second or the fourth sector of the collector cell,
   wherein transmitting and receiving the traffic to and from the WNE of the neighbor cell comprises transmitting and receiving traffic for the first sector of the neighbor cell using a backhaul portion of the second frequency band of the at least one frequency band.

8. The method of claim 1,
   wherein the wireless coverage area of the collector cell comprises a first, a second, a third, a fourth, a fifth, and a sixth sector of the collector cell,
   wherein the first sector of the collector cell is adjacent to the second and the sixth sector of the collector cell but is not substantially adjacent to either the third, the fourth, or the fifth sector of the collector cell,
   wherein the second and the sixth sector of the collector cell are not substantially adjacent to each other, wherein the fourth sector of the collector cell is adjacent to the third and the fifth sector of the collector cell but is not substantially adjacent to either the first, the second, or the sixth sector of the collector cell, wherein the third and the fifth sector of the collector cell are not substantially adjacent to each other, wherein traffic is transmitted and received to and from remote units within the first sector of the collector cell using a user portion of a first frequency band of the at least one frequency band, wherein traffic is transmitted and received to and from remote units within the second sector of the collector cell using a user portion of a second frequency band of the at least one frequency band, wherein traffic is transmitted and received to and from remote units within the third sector of the collector cell using a user portion of a third frequency band of the at least one frequency band, wherein traffic is transmitted and received to and from remote units within the fourth sector of the collector cell using a user portion of a fourth frequency band of the at least one frequency band, wherein traffic is transmitted and received to and from remote units within the fifth sector of the collector cell using a user portion of a fifth frequency band of the at least one frequency band, wherein traffic is transmitted and received to and from remote units within the sixth sector of the collector cell using a user portion of a sixth frequency band of the at least one frequency band, 9. The method of claim 8, wherein a wireless coverage area of the neighbor cell comprises a first, a second and a third sector of the neighbor cell, wherein the second sector of the neighbor cell is adjacent to the first and the third sector of the neighbor cell, wherein the first and the third sector of the neighbor cell are not substantially adjacent to each other, wherein the second sector of the neighbor cell is adjacent to the first sector of the collector cell but is not substantially adjacent to either the second or the sixth sector of the collector cell, wherein transmitting and receiving the traffic to and from the WNE of the neighbor cell comprises transmitting and receiving traffic for the first, the second, and the third sector of the neighbor cell using a backhaul portion of the third frequency band, a backhaul portion of the fourth frequency band, and a backhaul portion of the fifth frequency band.

10. The method of claim 8, wherein a wireless coverage area of the neighbor cell comprises a first, a second and a third sector of the neighbor cell, wherein the second sector of the neighbor cell is adjacent to the first and the third sector of the neighbor cell, wherein the first and the third sector of the neighbor cell are not substantially adjacent to each other, wherein the second sector of the neighbor cell is adjacent to the first sector of the collector cell but is not substantially adjacent to either the second or the sixth sector of the collector cell, wherein transmitting and receiving the traffic to and from the WNE of the neighbor cell comprises transmitting and receiving traffic for the first and the second sector of the neighbor cell using a backhaul portion of the third frequency band and a backhaul portion of the fourth frequency band.

11. Wireless network equipment (WNE) of a collector cell, the WNE comprising:

a transceiver operable within a wireless coverage area of the collector cell, wherein the wireless coverage area of the collector cell comprises a first, a second and a third sector of the collector cell;

a processing unit, communicatively coupled to the transceiver, adapted to receive uplink traffic from remote units within the first sector of the wireless coverage area of the collector cell using the transceiver and a user portion of a first frequency band of the at least one frequency band, to receive uplink traffic from remote units within the second sector of the collector cell using a user portion of a second frequency band of the at least one frequency band, and to receive uplink traffic from remote units within the third sector of the collector cell using a user portion of a third frequency band of the at least one frequency band, adapted to receive downlink traffic from WNE of a neighbor cell using the transceiver and a backhaul portion of the at least one frequency band, adapted to transmit the uplink traffic from the WNE of the neighbor cell to the WNE of the collector cell using the transceiver and a backhaul portion of the at least one frequency band, and adapted to transmit the downlink traffic from the WNE of the collector cell to the remote units within the first sector of the wireless coverage area of the collector cell using the transceiver and a user portion of the first frequency band of the at least one frequency band, to transmit downlink traffic to remote units within the second sector of the collector cell using a user portion of a second frequency band of the at least one frequency band, and to transmit downlink traffic to remote units within the third sector of the collector cell using a user portion of a third frequency band of the at least one frequency band.

12. The WNE of claim 11, wherein the transceiver comprises at least one access antenna and at least one narrowbeam antenna, wherein the processing unit is further adapted to receive uplink traffic from the remote units using the at least one access antenna, wherein the processing unit is further adapted to receive downlink traffic from the WNE of the neighbor cell using the at least one narrowbeam antenna, wherein the processing unit is further adapted to transmit the uplink traffic to the WNE of the neighbor cell using the at least one narrowbeam antenna, and wherein the processing unit is further adapted to transmit the downlink traffic from the WNE of the collector cell to the remote units using the at least one access antenna.

13. The WNE of claim 12, wherein the processing unit is further adapted to transmit both the user portion and the backhaul portion of the at least one frequency band using each of the at least one access antenna and each of the at least one narrowbeam antenna.

* * * * *